Nov. 14, 1950 W. L. COOK 2,530,289
METHOD FOR MOLDING OBJECTS OF
SPONGE RUBBER, AND THE LIKE
Filed Aug. 25, 1948 2 Sheets-Sheet 2

Inventor
Wallace L. Cook
By Seymour, Earle + Nichols
Attorneys

Patented Nov. 14, 1950

2,530,289

UNITED STATES PATENT OFFICE 2,530,289

METHOD FOR MOLDING OBJECTS OF SPONGE RUBBER AND THE LIKE

Wallace L. Cook, Chicago, Ill., assignor to The Whitney Blake Company, Hamden, Conn., a corporation of Connecticut Application August 25, 1948, Serial No. 46,158

3 Claims. (Cl. 18—53)

1

The present invention relates to improvements in the art of molding objects from expansible compounds such, for instance, as sponge rubber and the like, i. e., compounds which are (in their molded condition) expanded into cellular or porous structures.

In the art of molding objects from sponge rubber and the like, it has heretofore been the general practice to introduce into molding-cavities "biscuits" or charges of carefully-predetermined volume of the desired gas-expansible compounds prior to closing the mold-elements. Such biscuits or charges have been sufficiently smaller in volume than the volume provided by the given mold-cavity into which they are placed, to allow for the expansion of such charges when heated, under the action of the gas-producing materials included in the compound.

The above-outlined prior practice has been slow and cumbersome and hence expensive, since it has required the prior preparation of definite predetermined charges of compound and their individual placement in mold-cavities. Such procedure requires a relatively-long molding-cycle and hence ties up expensive molds and presses.

The main object of the present invention is to provide a superior method whereby objects of gas-expanded materials may be rapidly and economically produced without requiring the prior preparation of predetermined individual charges of material.

Another object of the present invention is to provide a superior method whereby objects of sponge rubber and the like may be rapidly and economically produced by injecting the gas-expansible material into the mold-cavities after the elements making up the said mold-cavities are in their normally closed position.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Figure 1:
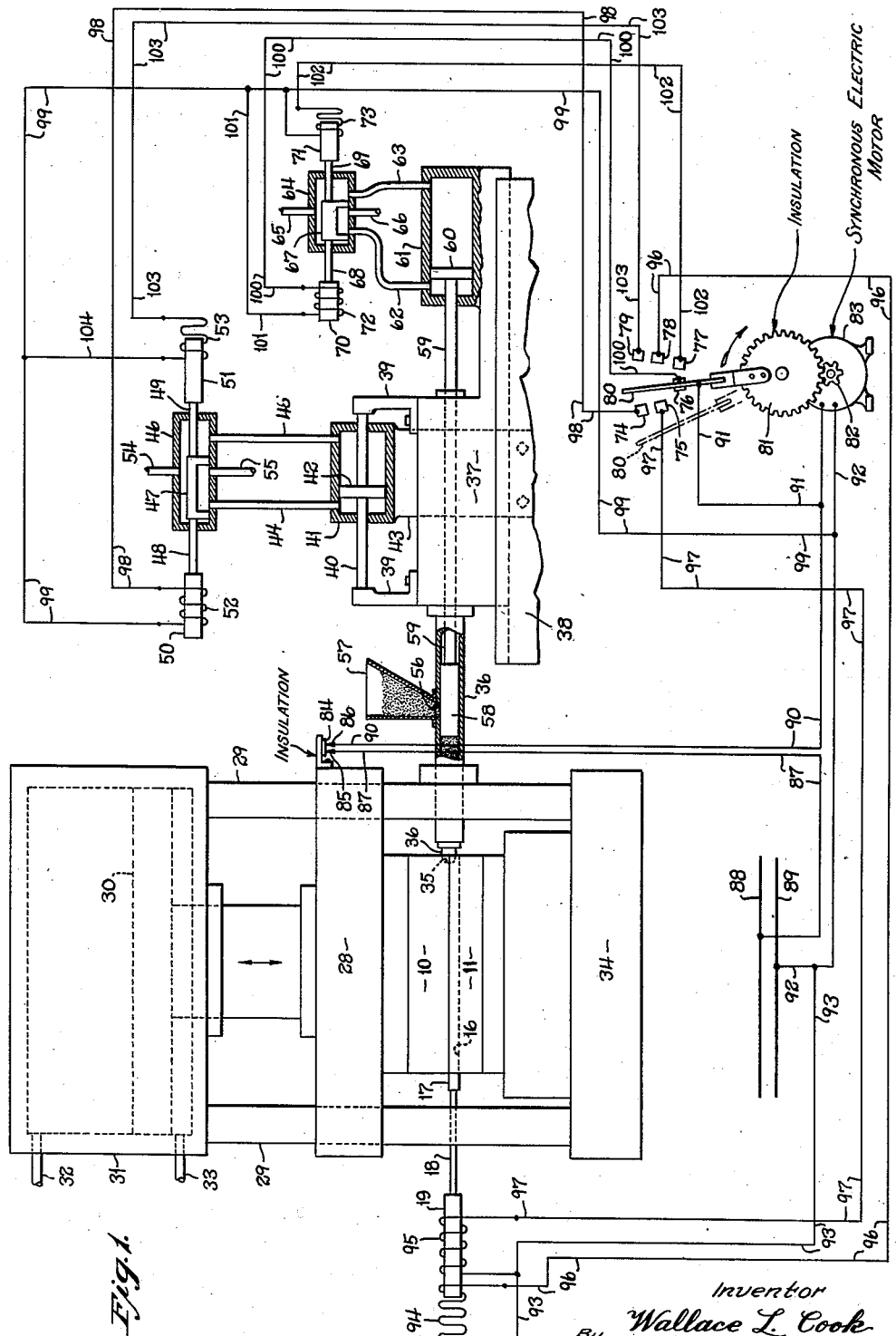
Fig. 1 is a schematic view illustrating an injection-molding apparatus suitable for carrying out the present invention.

The particular apparatus chosen for illustration in the accompanying drawings in order to make clear one mode of carrying out the present invention includes two complemental mold-members which in the present instance comprise an upper mold-member generally designated by the reference character 10 and a lower mold-member generally designated by the reference character 11.

In its upper face, the lower mold-member 11 is formed with two (more or less) molding-cavities 12—12 which are shaped to conform to the desired shape of the object to be molded. In the present instance, the mold-cavities are of substantially-cylindrical form, though obviously they may assume other forms necessary to produce objects of an infinite number of other shapes, in accordance with well-known molding practice.

Spaced slightly from the molding-cavities 12 is a sprue-passage 13 which is connected to each of the molding-cavities 12 by one of two gate-passages 14. Leading substantially radially outwardly from each of the mold-cavities 12 in a direction away from the adjacent gate-passage 14 is one of two guide-grooves 15—15 which at its outer end intersects a guide-groove 16 also formed in the upper face of the mold-member 11. The said guide-groove 16 extends at substantially a right angle with respect to the guide-grooves 15—15 and accommodates with a close sliding fit, a reciprocating actuating-slide 17 having a rod-like extension 18 projecting from one of its ends. The said extension 18 is preferably formed of brass or other nonmagnetic material and carries at its extreme outer end a core 19 formed of soft iron or other suitable magnetic material and designed for purposes as will hereinafter appear.

Figure 2:
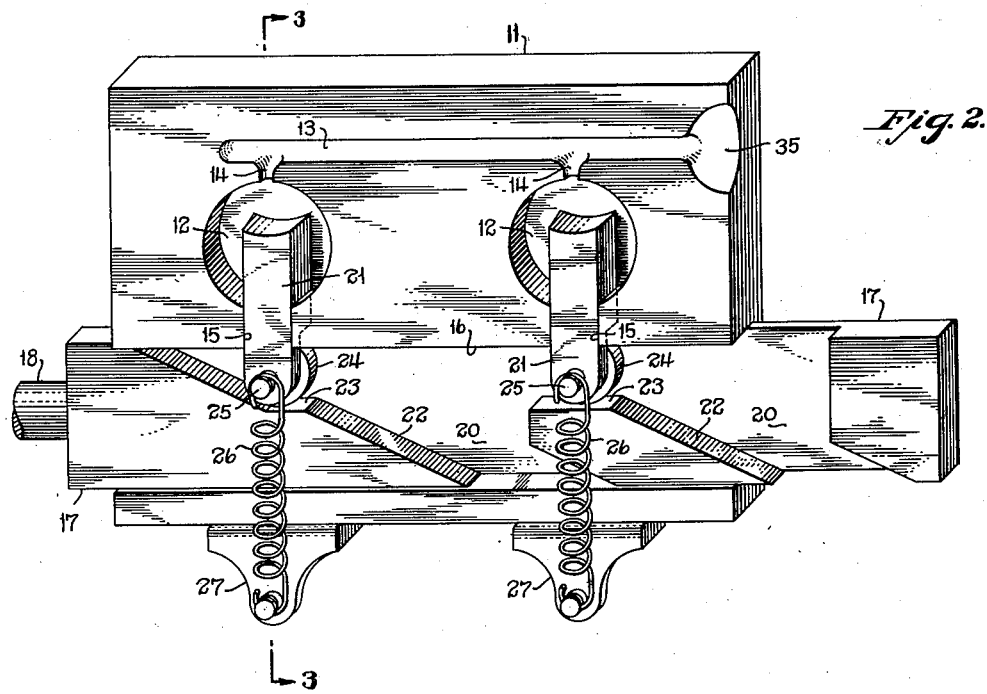
Fig. 2 is a perspective view of the lower mold-member, displacement-slides, and related parts, and showing the said displacement-slides in their advanced position.
Figures 3, 4:
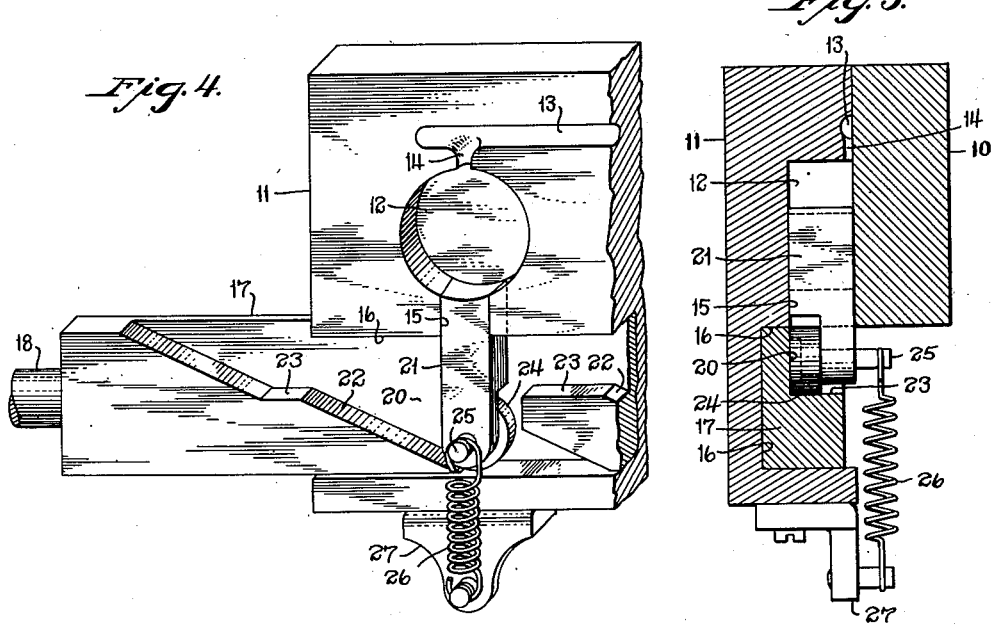
Fig. 3 is a broken sectional view taken on the line 3—3 of Fig. 2 and including the upper mold-member.
Fig. 4 is a fragmentary view similar to Fig. 2 but showing the displacement-slides in their retired position.

The reciprocating actuating-slide 17 above referred to is formed in its upper face with two interconnected recesses 20, in each of which is adapted to be received the outer end of one of two displacement-slides 21—21. The said displacement-slides are respectively adapted to reciprocate in the adjacent radial guide-grooves 15—15 in the mold-member 11. The respective outer wall of each of the recesses 20 contitutes a cam-surface 22 having a dwell 23, as is shown in Figs. 2 and 4.

The outer end of each of the displacement-slides 21—21 is provided with an antifriction roller 24 which is adapted to engage with the adjacent cam-surface 22 and with the dwell 23, in a manner as will hereinafter appear. The said roller is mounted for rotation upon a stud 25 to which is attached the inner end of a helical retracting-spring 26 which has its outer end anchored to a stud mounted in a suitable bracket 27 at the adjacent outer face of the mold-member 11. Each spring 26 serves, when permitted by the actuating-slide 17, to outwardly retire the displacement-slide 21 to which it is attached.

The upper mold-member 10 above referred to is carried by the reciprocating crosshead 28 of a molding-press which may be of any suitable form. The said crosshead 28 is adapted to ride upon a suitable number of vertical tie-rods 29 and is advanced and retired by means of a piston 30 operating within a hydraulic cylinder 31, as is indicated in Fig. 1. The said cylinder is provided with two pipes or tubes 32 and 33 respectively located above and below the piston 30 and respectively adapted to admit or exhaust fluid, whereby the said piston and the parts carried thereby may be moved in opposite directions, all in the manner well understood in the art.

The complemental lower mold-member 11 is supported upon the base 34 of the molding-press, which latter is connected to the cylinder 31 by means of the tie-rods 29 before referred to.

The mold-member 10 and the mold-member 11 are jointly formed at their ends with a spherically-contoured socket 35 with which the sprue-passage 13 in the mold-chamber 11 connects. The said socket is adapted to receive the spherically-contoured outer end of a tubular injection-nozzle 36 which is adapted to reciprocate into and out of engagement with the said socket, in a manner as will hereinafter appear.

The injection-nozzle 36 above referred to is rigidly carried by a carriage 37 mounted for reciprocation toward and away from the adjacent ends of the mold-members 10 and 11, upon a base 38. Projecting upwardly from the end of the carriage 37 nearest the mold-members 10 and 11 are two rigid spaced-apart brackets 39—39. Extending between and supported by the brackets 39—39 is a piston-rod 40 which extends axially through a cylinder 41 and carries a piston 42 located within the said cylinder. The said cylinder 41 is rigidly carried at the upper end of a bracket 43, having its lower end rigidly secured to the stationary base 38, as is indicated in Fig. 1.

The opposite end-portions of the cylinder 41 are respectively connected by means of tubes or ducts 44 and 45 to the similar end-portions of a valve-housing 46. Mounted for reciprocation within the valve-housing 46 is a reciprocating gate or slide 47 having operating-rods 48 and 49 respectively projecting from its opposite end through the adjacent end-walls of the said valve-housing 46, as is schematically indicated in Fig. 1. The operating-rods 48 and 49 are preferably formed of brass, bronze or other suitable nonmagnetic material and they respectively carry at their outer ends one of two cores 50 and 51 formed of soft iron or other suitable magnetic material. The core 50 is adapted to operate within a solenoid-coil 52. Similarly, the core 51 is adapted to operate within a similar solenoid-coil 53. Substantially centrally, the valve-housing 46 above referred to has connected into it an inlet-tube 54 leading from a suitable source of fluid pressure, and an outlet-tube 55 leading to a suitable drain.

The injection-nozzle 36 before referred to is in tubular form and has an aperture 56 in one side with which communicates the lower end of a hopper 57 in which may be charged a suitable compound for forming sponge rubber or the like. Adapted to reciprocate within the hollow injection-nozzle 36 is a feed-plunger 58 which is coupled by means of a connecting-rod 59 to a piston 60. The said piston 60 is adapted to reciprocate in a cylinder 61 which is rigid with the carriage 37 before referred to.

Respectively connected to the opposite end-portions of the cylinder 61 are two tubes or ducts 62 and 63. The ends of the tubes 62 and 63 remote from the cylinder 61 extend into a valve-housing 64. Also communicating with the interior of the valve-housing 64 are an inlet-tube 65 and an outlet-tube 66 respectively leading from a source of hydraulic pressure and to a suitable drain, in a manner well understood in the art.

Mounted for reciprocation within the valve-housing 64 is a gate or slide 67 having operating-rods 68 and 69 respectively projecting from its opposite ends through the adjacent end-walls of the valve-housing 64. The said operating-rods 68 and 69 are preferably formed of nonmagnetic material and respectively carry at their outer ends cores 70 and 71 both formed of soft iron or other suitable magnetic material. The said cores 70 and 71 are adapted to reciprocate within solenoid-coils 72 and 73, all for purposes as will hereinafter appear.

In conjunction with the features above described, there is employed a control-mechanism such as the control-mechanism shown at the lower right of Fig. 1, and which includes a plurality of contact-plates 74, 75, 76, 77, 78 and 79, all of which are adapted to be swept over by a brush-like switch-arm 80. In the instance shown the contact-arm 80 is carried by a rotary gear-wheel 81 which is formed of insulating material and which is meshed into and driven by a drive-pinion 82 forming a feature of a synchronous electric motor 83 or other suitable timing device.

The crosshead 28 of the molding-press carries a contact-plate 84 which is adapted to engage and electrically interconnect two contacts respectively numbered 85 and 86 when the said crosshead 28 is moved toward the mold-member 11 to engage the mold-member 10 therewith, as is indicated in Fig. 1. The contact 85 just referred to is connected by means of a wire 87 to a main-line wire 88, which latter is a companion to another main-line wire 89. Both of the said main-line wires lead from any suitable source of electric current. The remaining contact 86 is connected by means of a wire 90 to one terminal of the synchronous electric motor 83. The wire 90 is connected by means of a branch wire 91 to the switch-arm 80 located adjacent the motor 83.

From the foregoing it will be seen that the switch comprising the elements 84, 85 and 86 controlled by the movement of the crosshead 28 of the molding-press, controls the flow of current to the synchronous electric motor 83 and also to the switch-arm 80 and, therefore, to all the contacts 74 to 79 inclusive and the features connected therewith.

The main-line wire 89 is connected by means of a wire 92 to the remaining terminal of the synchronous electric motor 83, all as is indicated in Fig. 1. The wire 92 has connected into it a wire 93 leading to one terminal of each of two solenoid-coils 94 and 95 respectively adapted to have the core 19 extend thereinto. The remaining terminal of the solenoid-coil 94 is connected by means of a wire 96 to the contact-plate 78 which is located adjacent the synchronous electric motor 83. The remaining terminal of the companion solenoid-coil 95 is connected by means of a wire 97 to the contact-plate 75.

The contact-plate 74 adjacent the motor 83 is connected by means of a wire 98 to one terminal of the solenoid-coil 52. The remaining terminal of the said solenoid-coil 52 is connected by means of a wire 99 to the wire 92 and hence to the main-line wire 89.

The contact-plate 76 adjacent the motor 83 is connected by means of a wire 100 to one terminal of the solenoid-coil 72, which latter has its remaining terminal connected by means of a wire 101 to the wire 99 before referred to.

The contact-plate 77 adjacent the motor 83 is connected by means of a wire 102 to one terminal of the solenoid-coil 73 previously described. The remaining terminal of the said solenoid-coil 73 is connected directly to the wire 99 before referred to. The contact-plate 79 of the control-mechanism is connected by means of a wire 103 to one terminal of the solenoid-coil 53, which latter has its remaining terminal connected by means of a wire 104 to the wire 99 previously referred to.

The gas-expansible compounds suitable for use in the apparatus above described are very numerous, but the following compounds (parts by weight) may be mentioned by way of example:

|  | 1 | 2 | 3 |
|---|---|---|---|
| Pale Crepe Rubber | 100.00 | | |
| Butadiene-Styrene Copolymer (GR-S) | | 100.00 | |
| Chloroprene Polymer (Neoprene GR-M) | | | 100.00 |
| Zinc Salt of Xylyl Mercaptan (RPA No. 5) 50% with 50% Solvent such as Kerosene | | 2.00 | |
| Zinc Oxide | 5.00 | 5.00 | 5.00 |
| Light Calcined Magnesia | | | 4.00 |
| Fine Carbon Black | 2.00 | | 2.00 |
| Coarse Carbon Black | | 50.00 | |
| Calcium Carbonate | 90.00 | | 50.00 |
| Sodium Bicarbonate | 10.00 | | |
| Mixture of 40 parts of Di Nitroso Penta Methylene Tetramine Dispersed in 60 parts of Inert Inorganic Filler such as Clay (Unicel ND) | | 1.5 | 1.5 |
| Stearic Acid | 10.00 | | |
| Refined Petroleum Oil (Nujol) | | 40.00 | 15.00 |
| Petrolatum | 10.00 | 3.00 | 3.00 |
| Condensation Product of Butyraldehyde and Aniline (Antox) | | | 2.00 |
| Phenyl Alpha Napthylamine (Neozone A) | 1.00 | 1.0 | |
| Tetra Methyl Thiuram Mono Sulfide (Thionex) | 0.1875 | 0.5 | |
| Sulfur | 3.50 | 3.0 | |
| Salicylic Acid (Retarder W) | | 1.0 | |
| Mercapto Benzothiazyl Disulfide | | | 0.5 |
| Sodium Acetate | | | 0.5 |

*Operation*

For purposes of description, let it be assumed that the crosshead 28 of the press is raised so as to leave a space between the mold-members 10 and 11 and, further, that the injection-nozzle 36 is retired away from the said mold-members and that the displacement-slides are retired into the positions indicated in Fig. 4.

Now, when hydraulic pressure from any suitable source is fed into the upper portion of the cylinder 31, the piston 30 will be moved downwardly into the position in which it is shown in Fig. 1 to thus engage the underface of the mold-member 10 with the upper face of the mold-member 11. The movement of the crosshead 28 just described will also engage the contact-plate 84 with the contacts 85 and 86 thereby supplying current to both the switch-arm 80 and the synchronous electric motor 83, which latter will immediately start to operate to thus swing the said switch-arm 80 in a clockwise direction from the position indicated by broken lines in Fig. 1.

The switch-arm 80 will substantially simultaneously engage with the contact-plates 74 and 75 thereby energizing the solenoid-coil 52 and the solenoid-coil 95.

The energization of the solenoid-coil 52 will cause the core 50 to be drawn into the position in which it is indicated in Fig. 1 to thereby shift the gate or slide 47 into position to supply hydraulic pressure through the tube 45 to the right end-portion of the cylinder 41. The hydraulic pressure will move the piston 42 from right to left and thus move the carriage 37 in a similar direction to seat the end of the injection-nozzle 36 in the socket 35 provided jointly in the adjacent ends of the mold-members 10 and 11.

The energization of the solenoid-coil 95 will cause the core 19 to move from left to right, thus similarly moving the actuating-slide 17. The said movement of the actuating-slide 17 will, in turn, cause its cam-surfaces 22—22 to advance the displacement-slides 21—21 into their respective molding-cavities 12—12 to thus reduce, for the time being, the volumetric capacities of the said mold-cavities. The respective rollers 24 of the displacement-slides 21—21 will, under the present circumstances, come to rest upon the adjacent dwells 23—23 until such time as the actuating-slide 17 is moved in an opposite direction. The mechanism is now in condition for the injection of sponge rubber or similar compounds into the molding-cavities 12—12.

After having engaged the contact-plates 74 and 75 as above described, the switch-blade 80 will engage the contact-plate 76, thereby energizing the solenoid-coil 72 to thus bring the core 70 into the position in which it is indicated in Fig. 1. The described movement of the core 70 will also shift the gate or slide 67 into the position in which it is indicated in Fig. 1. The described movement of the gate or slide 67 will serve to supply hydraulic pressure to the right end of the cylinder 61, thereby forcing the piston 60 from right to left to thus similarly move the feed-plunger 58. The movement of the feed-plunger 58 will cause the desired amount of expansible compound to be rapidly injected through the sprue-passage 13 and gate-passages 14—14 into both of the molding-cavities 12—12 while the same have their volumetric capacities reduced by the inward position of the displacement-slides 21—21. It may be explained, in this connection, that under the present circumstances, the mold-members 10 and 11 would be pre-heated by any suitable means and kept at an elevated temperature, in accordance with usual practice.

After having engaged the contact-plate 76, the switch-arm 80 will next engage the contact-plate 77, thereby energizing the solenoid-coil 73, while the injection-nozzle 36 is still in its advanced position and while the mold-members 10 and 11 are still in engagement. The energization of the solenoid-coil 73 will pull the core 71 from left to right, thereby similarly shifting the gate or slide 67. The described shifting of the gate or slide 67 will vent the right end of the cylinder 61 and immediately supply hydraulic pressure to the left end of the cylinder 61 with the effect of retracting the feed-plunger 58. Immediately following the retraction of the feed-plunger 58, the switch-arm 80 will substantially simultaneously engage with both of the contact-plates 78 and 79.

The engagement of the switch-arm 80 with the contact-plate 78 as described, will energize the solenoid-coil 94, with the effect of drawing the core 19 from right to left and similarly moving the actuating-slide 17. The described movement of the actuating-slide 17 will permit the retracting-springs 26—26 to retire their respective displacement-slides 21—21 until (as is preferred) the respective inner surfaces of the said displacement-slides coincide with the lateral walls of their respective molding-cavities 12—12, as is indicated in Fig. 4. The described retirement of the displacement-slides 21—21 will permit the compound previously injected into the molding-cavities to expand to fill the now increased volumetric capacity of the latter.

Substantially simultaneously with its engagement with the contact-plate 78, the switch-arm 80 will also engage the contact-plate 79, as above described, to thereby energize the solenoid-coil 53. The energization of the solenoid-coil 53 will draw the gate or slide 47 from left to right, thereby coincidentally exhausting the right end of the cylinder 41 and supplying hydraulic fluid to the left portion of the said cylinder. The hydraulic fluid will now move the piston 42 from left to right, to thus retract the carriage 37 and retire the injection-nozzle 36 out of engagement with the socket 35 in the adjacent ends of the respective mold-members 10 and 11.

After the completion of the cycle just referred to, the mold-members 10 and 11 may be left closed for a desired length of time to effect vulcanization or other desired reaction. As soon as hydraulic pressure is supplied to the lower portion of the cylinder 31 through the tube 33, the mold-member 10 will be lifted to thus permit the newly-molded articles to be removed from the molding-cavities 12—12 and also to disengage the contact-plate 84 from the contacts 85 and 86, to thus stop the synchronous electric motor 83.

Another complete cycle like that above described may be initiated by again lowering the mold-member 10, as previously described, in connection with the first-described cycle.

It will be apparent from the foregoing that the injection of the selected expansible compound into the mold-cavities 12—12 or their equivalent, is effected while the volumetric capacity thereof is reduced by the displacement-slides 21—21 being in their advanced positions. It will further be apparent that immediately following the injection of the desired expansible molding material and after the cessation of injection pressure, the volumetric capacity of the said molding-cavities 12—12 is immediately increased to its intended maximum, to thereby permit the expansible material to swell and fill the entire cavities.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. The method for molding porous or cellular objects of sponge rubber or the like, including the steps of: preparing a mixture of gas-expansible molding material having gas-producing material intermixed therewith; reducing the volumetric capacity of a molding-cavity; thereafter injecting the said gas-expansible molding material together with its said gas-producing material into the said molding-cavity while the latter has its volumetric capacity reduced; subsequently to the said injection, expanding the volumetric capacity of the said molding-cavity while maintaining the latter closed; and causing the injected molding material to be expanded by its intermixed gas-producing material into a porous or cellular condition in the now-expanded molding-cavity.

2. The method for molding porous or cellular objects of sponge rubber or the like, including the steps of: preparing a mixture of gas-expansible molding material having gas-producing material intermixed therewith; reducing the volumetric capacity of a molding-cavity by temporarily projecting displacement-means thereinto; thereafter injecting the said gas-expansible molding material together with its intermixed gas-producing material into the said molding-cavity while the said displacement-means is projected thereinto; subsequently to the said injection, retiring the said displacement-means to expand the volumetric capacity of the said molding-cavity while still maintaining the latter closed; and causing the injected molding material to be expanded by its intermixed gas-producing material into a porous or cellular condition in the now-expanded molding-cavity.

3. The method for molding porous or cellular objects of sponge rubber or the like, including the steps of: preparing a mixture of gas-expansible molding material having gas-producing material intermixed therewith; reducing the volumetric capacity of a molding-cavity by temporarily projecting displacement-means thereinto; thereafter injecting the said gas-expansible molding material together with its intermixed gas-producing material into the said molding-cavity while the said displacement-means is projected thereinto; subsequently to the said injection, retiring the said displacement-means into a position to form part of the surface of the said molding-cavity and to expand the volumetric capacity of the said molding-cavity while maintaining the latter closed; and causing the injected molding material to be expanded by its intermixed gas-producing material into a porous or cellular condition in the now-expanded molding-cavity.

WALLACE L. COOK.

REFERENCES CITED

The following references are of record in the file of this patent:

UNITED STATES PATENTS

| Number | Name | Date |
|---|---|---|
| 2,298,716 | Moreland et al. | Oct. 13, 1942 |
| 2,308,971 | Carter | Jan. 19, 1943 |
| 2,331,687 | Hobson | Oct. 12, 1943 |
| 2,331,688 | Hobson | Oct. 12, 1943 |
| 2,372,695 | Taylor | Apr. 3, 1945 |